US012631367B2

(12) United States Patent
Malaker et al.

(10) Patent No.: US 12,631,367 B2
(45) Date of Patent: May 19, 2026

(54) UNIVERSAL MOUNT FOR FIXTURE COVER

(71) Applicant: Homewerks Worldwide, LLC, Lake Bluff, IL (US)

(72) Inventors: Michael Malaker, Kenosha, WI (US); Lin Tiao Hao, Foshan City (CN); Zhang Enlun, Foshan City (CN)

(73) Assignee: Homewerks Worldwide, LLC, Lake Bluff, IL (US)

( * ) Notice: Subject to any disclaimer, the term of this patent is extended or adjusted under 35 U.S.C. 154(b) by 61 days.

(21) Appl. No.: 18/947,870

(22) Filed: Nov. 14, 2024

(65) Prior Publication Data

US 2025/0163960 A1 May 22, 2025

Related U.S. Application Data

(60) Provisional application No. 63/599,717, filed on Nov. 16, 2023.

(51) Int. Cl.

| | |
|---|---|
| ***F24F 13/08*** | (2006.01) |
| ***F04D 29/42*** | (2006.01) |
| ***F21V 33/00*** | (2006.01) |
| ***F24F 7/007*** | (2006.01) |
| ***F24F 7/10*** | (2006.01) |
| ***F24F 13/20*** | (2006.01) |
| ***H04R 1/02*** | (2006.01) |

(52) U.S. Cl.
CPC ........ *F24F 13/084* (2013.01); *F04D 29/4226* (2013.01); *F21V 33/00* (2013.01); *F24F 7/007* (2013.01); *F24F 7/10* (2013.01); *F24F 13/08* (2013.01); *F24F 13/20* (2013.01); *H04R 1/02* (2013.01); *F24F 2221/14* (2013.01)

(58) Field of Classification Search
CPC .......... F24F 13/084; F24F 13/08; F24F 13/20; F24F 2221/14; F24F 7/007; F24F 7/10; F04D 29/4226; F21V 33/00; H04R 1/02
See application file for complete search history.

(56) References Cited

U.S. PATENT DOCUMENTS

2019/0277520 A1* 9/2019 Zakula .................. F24F 13/078
2022/0057105 A1* 2/2022 Regnier ................ F24F 13/085
(Continued)

FOREIGN PATENT DOCUMENTS

CA 3071516 A1 * 8/2020 ............ F24F 13/084
EP 3730847 B1 * 11/2025 ............. F24F 13/10

OTHER PUBLICATIONS

Lowes, Broan-NuTone Easy Install Bathroom Fan Plastic Replacement Grille Cover, Oct. 29, 2019 (review) (Year: 2019).*
(Continued)

*Primary Examiner* — Andrew J Marien
(74) *Attorney, Agent, or Firm* — COZEN O'CONNOR

(57) ABSTRACT

A universal mount includes a first grille surface configured to face a fixture. The universal mount includes a pair of opposing rails that extend from the first grille surface, wherein each of the rails has a lateral extension, the lateral extensions facing each other forming a gap. The universal mount includes a slide arranged between the first grille surface and the lateral extensions and configured to move along the pair of rails. The universal mount includes at least one end wall arranged at a lateral end of the pair of rails configured to limit movement of the slide.

5 Claims, 8 Drawing Sheets

(56) References Cited

U.S. PATENT DOCUMENTS

| | | | | |
|---|---|---|---|---|
| 2022/0128262 A1* | 4/2022 | Wright | .................. | F24F 13/084 |
| 2023/0204250 A1* | 6/2023 | Smith | .................. | F24F 13/084 454/289 |

OTHER PUBLICATIONS

Broan Nutone "Broan Universal CleanCover Bathroom Exhaust Fan Upgrade Grille/Cover" 202 (brochure) (plus reviews from 5 years ago) (Year: 2020).*

* cited by examiner

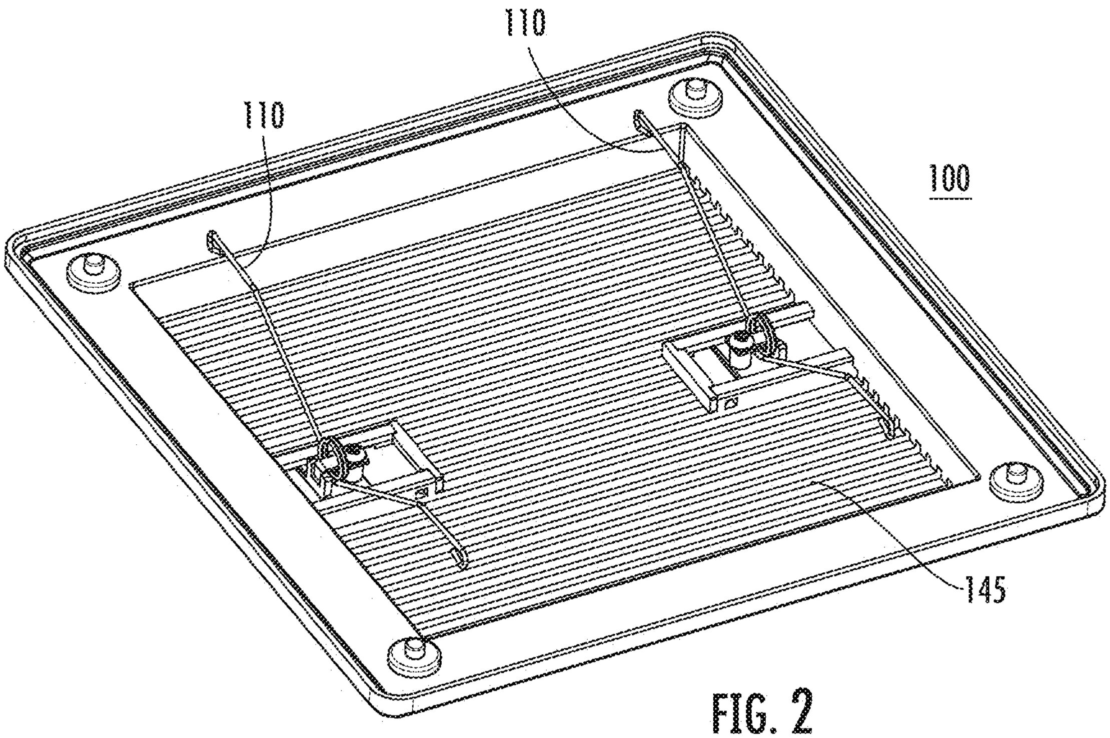
FIG. 2
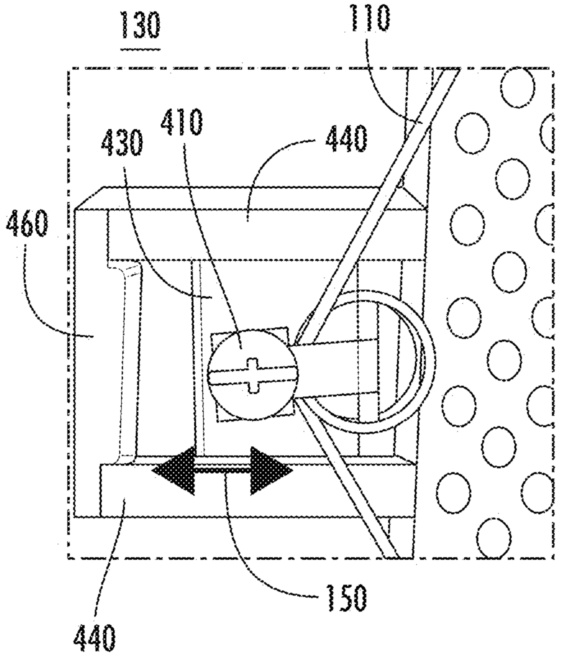

UNIVERSAL MOUNT FOR FIXTURE COVER

RELATED APPLICATIONS

This application claims priority from U.S. Provisional Patent Application Ser. No. 63/599,717 which was filed on Nov. 16, 2023.

BACKGROUND OF THE INVENTION

1. Field of the Invention

The present disclosure relates to a grille that can accommodate a variety of fixture housing sizes. More particularly, the disclosure relates to a universal mount for a grille that adjusts to fit fixture housings of different sizes such as a grille for a bath fan housing.

2. Description of the Related Art

Mounted lights and exhaust fans are known in the art. These lights and exhaust fans will be discussed generally as fixtures. As is known, several factors make close-to-the-ceiling fixtures an ideal choice including a streamline aesthetic appearance, a low ceiling height (typically ceiling heights of 8 feet or less), a need for widespread illumination, and a need for in ceiling ventilation.

These fixtures generally include a lens to cover a bulb, a trim ring, or a grille to conceal a fan. Some grilles include light(s), ventilation slots, and speaker(s), which may be a Bluetooth speaker or other nearfield communication protocol speaker. Ceiling mounted lights are used for overhead lighting, due to the lack of overhead clearance. Close-to-the-ceiling lights usually provide general, or ambient, illumination for an entire room. Hallways, entryways, bathrooms, bedrooms and closets are spaces where ambient lighting is important.

The grilles are usually mounted to a housing using magnets, clips, and spring mounts. Each housing has a distinct mount. Spring mounts are generally V-shaped and are biased to expand the V-shaped spring. The springs are compressed to slide into a slot in the housing and when spread, keep the grille affixed to the housing. The spring has to align with the housing slot for a proper mating. Additionally, the slots in various housings have different lengths, which require different V-shaped springs.

The grilles are usually made from plastic or metal. Over time, metal can scratch, and plastic can discolor. Additionally, homeowners seek to change grilles to change the appearance of a room or upgrade features.

SUMMARY OF THE INVENTION

What is needed is a universal mount to allow consumers to change grilles without the need to replace an entire fixture assembly.

Several common housing sizes for fixtures exist. These sizes represent so-called “standard” sizes in the industry. The housing is the component that holds a motor and is recessed into a ceiling, wall, or other out-of-the way space. The spring clip connection used to attach a grille to the housing varies by brand, e.g., by standard. Disclosed is a universal grille mount, which is adjustable, so that a single grille will fit a plurality of different standard housings, namely different sized housings. Different spring configurations are utilized in the industry.

An embodiment is directed to a grille having a sliding spring clip moveable within a channel to accommodate different housing slot spacings. Typically, housing sizes are 7.25"×7.5", 9.25"×9.25", or 10"×10", the positioning of the spring clip will adjust outward or inward as needed.

One aspect of the invention is a grille with a slide mount having different sizes and shapes of spring clips, wherein the springs are interchangeable.

According to one aspect of the invention, the grille is a spring mounted grille. The spring is mounted to the grille such that it is adjustable to mate with housing slots at different locations. Specifically, oppositely positioned springs are slidably mounted in the grille so that they can be adjusted to be closer or further from each other.

According to one aspect of the invention, the spring is removably attached to a sliding mechanism. The sliding mechanism is arranged in a channel that guides the sliding mechanism so that it can be adjusted to match a mounting slot spacing in a housing.

According to one aspect of the invention, a kit is provided that includes a grille and at least two pairs of springs. The grille includes an adjustable spring mount that provides for adjustment of a spacing between opposing springs to match a spring receiver in a housing of a fixture.

In some aspects, the techniques described herein relate to a universal mount for a grille, including: a first grille surface configured to face a fixture; a pair of parallel rails that extend from the first grille surface, wherein each of the parallel rails has a lateral extension, the lateral extensions facing each other forming a gap; a slide arranged between the first grille surface and the lateral extensions and configured to move along the pair of parallel rails; and at least one end wall arranged at a lateral end of the pair of parallel rails configured to limit movement of the slide.

In some aspects, the techniques described herein relate to a universal mount, wherein the slide includes: a first portion having a first width and arranged proximate to the first grille surface; and a second portion having a second width that extends from the first portion away from the first grille surface, wherein the first width is greater than the second width.

In some aspects, the techniques described herein relate to a universal mount, wherein the slide further includes: a spring receptacle arranged in the second portion configured to receive a grille mounting spring; and a retaining arm configured to enclose an upper end of the spring receptacle.

In some aspects, the techniques described herein relate to a universal mount, wherein the retaining arm is attached to the second portion by a screw.

In some aspects, the techniques described herein relate to a grille kit having: a grille including a universal mount, with a first grille surface configured to face a fixture and a pair of parallel rails that extend from the first grille surface. Each of the parallel rails has a lateral extension, the lateral extensions face each other and form a gap. A slide is arranged between the first grille surface and the lateral extensions and configured to move along the pair of parallel rails. At least one end wall is arranged at a lateral end of the pair of parallel rails and configured to limit movement of the slide. A spring is also provided in each slide.

BRIEF DESCRIPTION OF THE DRAWINGS

The following detailed description references the drawings, in which:

FIG. 2 is a perspective view of a rear view of the grille;

DETAILED DESCRIPTION OF THE EXEMPLARY EMBODIMENTS

While the following description generally discusses mounting a grille to a housing, it should be appreciated that the adjustable spring mount can be used for a light, speaker cover, or the like, which will be commonly referred to as a grille.

Figure 1:
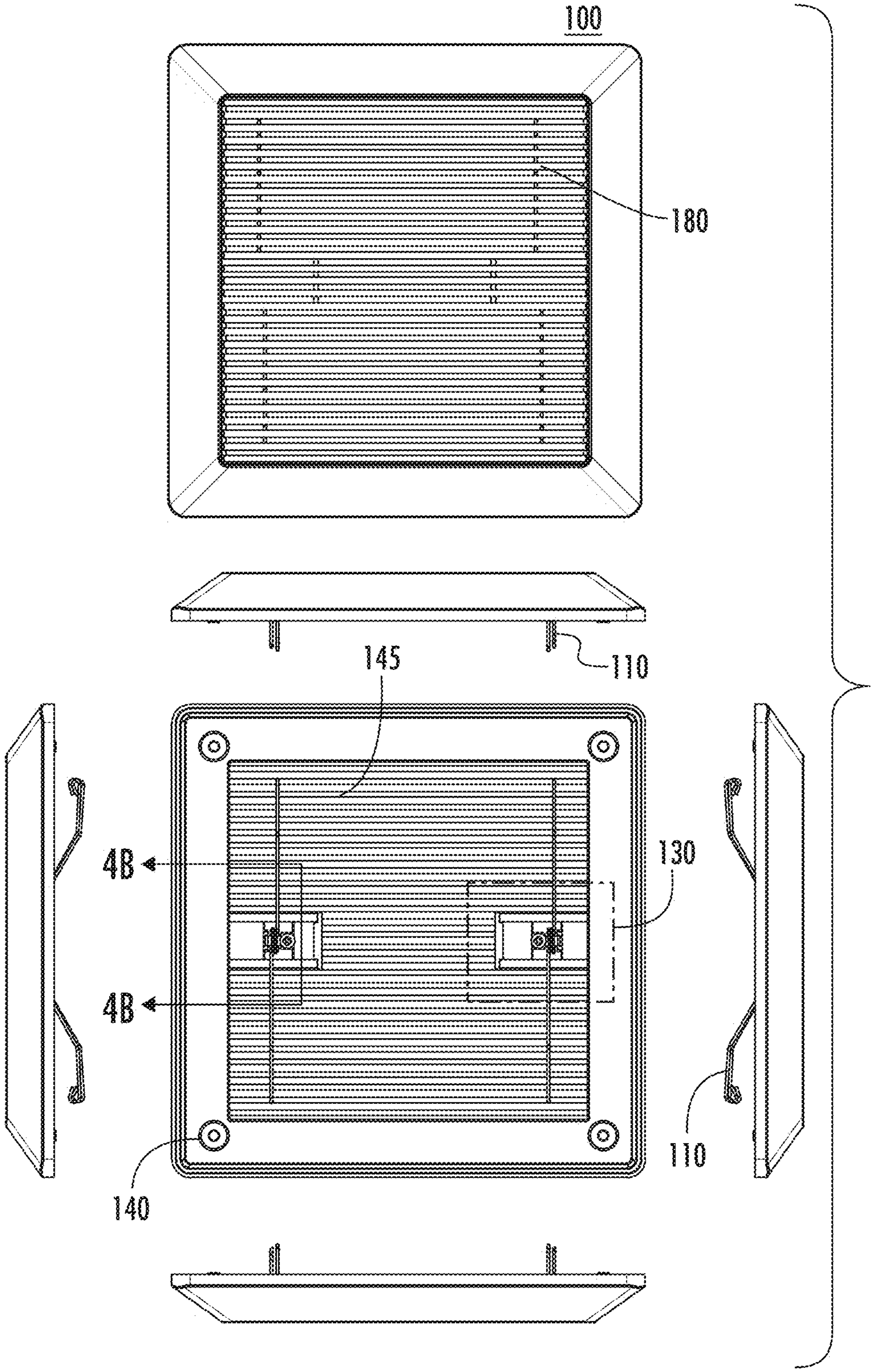
FIG. 1 shows six views of a grille with a detail top view of an adjustment mechanism.

FIG. 1 is a grille 100 showing top, side, front and rear views. The front of grille 100 is surface 180. In one aspect of the invention, the peripheral edges of the grille 100 are sloped to provide a dome-like contour for the grille 100. As shown, there are two springs 110 that are affixed to a rear 145 of the grille 100. The springs are slidably affixed to the rear 145 of the grille 100 via an adjustable mechanism 130. A detail of the adjustable mechanism 130 is shown in FIG. 1. The rear 145 of the grille 100 also includes posts 140. In one aspect of the invention the posts 140 include magnetic elements.

The adjustable mechanism 130 is shown in detail in FIG. 2 and includes two rails 440 that form a channel. A slide 430 is slidably arranged between the two rails 440 in the channel. The slide 430 is wider than the opening between the two rails 440 so that the slide 430 is retained in the channel formed by the two rails 440. Alternatively, the coupling between the slide and rails can be enabled through a tongue/groove arrangement (not shown). In either case, the slide 430 is configured to move laterally in the channel as shown by the arrow 150. The spring 110 is mounted in a depression in the slide 430. A retaining arm 420 secures the spring 110 to the slide 430. A screw 410 holds the retaining arm 420 to the slide 430. Alternatively, the spring 110 can be retained in a clip, which is molded into the slide 430.

As further shown in FIG. 2, there are two adjustable mechanisms 130 arranged opposite each other proximate to the edges of the grille. The adjustable mechanisms 130 are arranged so that their respective springs 110 can be inserted into slots in various housings.

Figure 3:
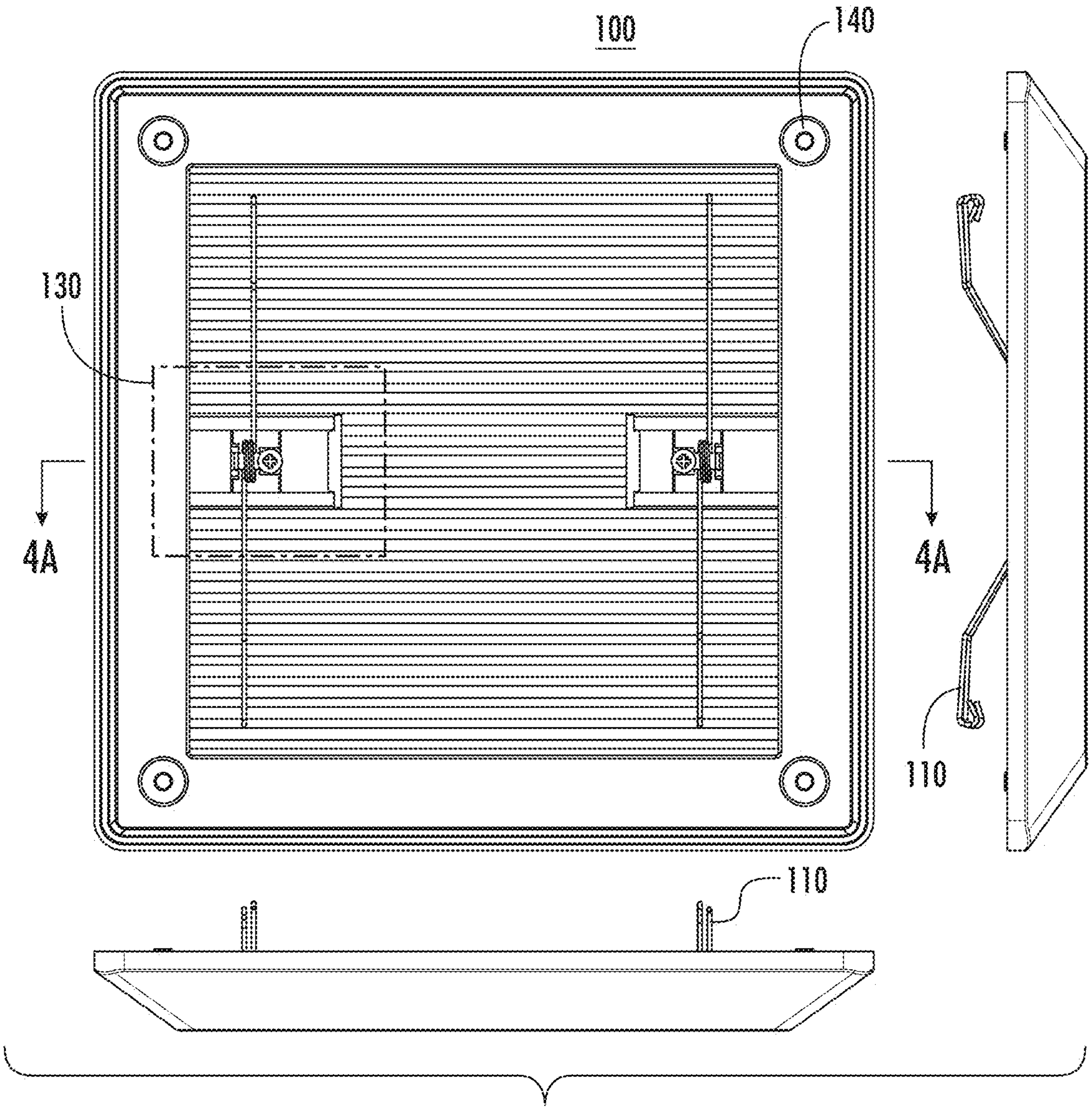
FIG. 3 shows top and side views of a grille.

FIG. 3 shows a top and side view of a grille 100. In one aspect of the invention, the grille 100 is square, about 10.25 inches or 260 mm on each side. The height of the grille 100 is about 1 inch or about 26.5 mm. The grille can be deeper to accommodate a Bluetooth speaker or LED lighting element. In FIG. 3, the grille comprises a plurality of slots or a grating to provide airflow for a vent or exhaust fan. Alternatively, the slots or grating can be replaced with a panel, lighting element, or the like.

Figure 4A:
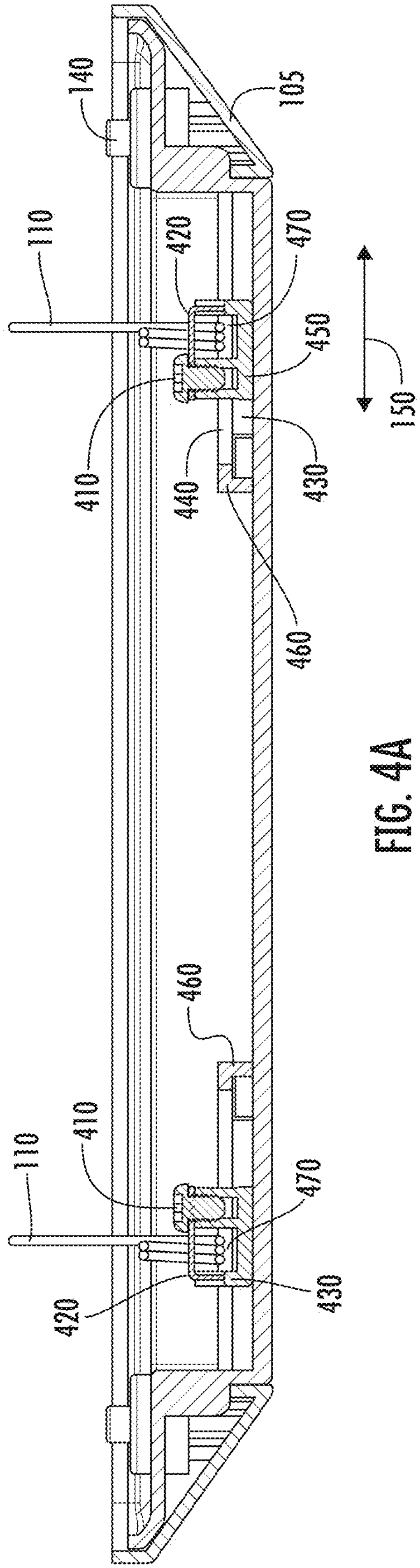
FIG. 4A is a cross section of a grille along the line 4A-4A in FIG. 3.

FIG. 4A is a cross section of grille 100 along the line 4A-4A in FIG. 3. As shown, a channel is formed by rails 440. The rails 440 are parallel to each other. The slide 430 is able to move laterally along the channel as shown by arrow 150. The slide 430 has a base 450. The travel of the slide 430 is bounded by an end wall 460 at an inner end of the channel and by an outer edge of the grille at an opposite end of the channel. It should be noted that each end of the channel can have an end wall 460 to limit travel of the slide 430.

The spring 110 is mounted to the slide in a receptacle 470. The spring 110 includes a central circular portion and two radially extending arms. The central circular portion of the spring provides biasing for the arms. While a central circular portion is shown, the spring can be formed without such circular portion if the material provides sufficient biasing. Retaining arm 420 passes through a central portion of the spring 110. The retaining arm 420 is secured to the slide 430 by a screw 410. Alternatively, the slide 430 can include a clip to retain the spring 110.

As shown in FIG. 4A, the outer edge 105 of the grille 100 can be a separate piece. This allows for different edge configurations of the grille 100, such as for a variety of different aesthetics.

Figure 4B:
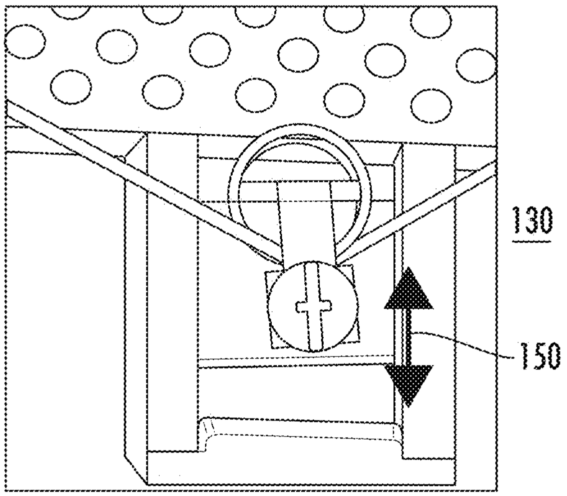
FIG. 4B is a cross section of a grille along the line 4B-4B in FIG. 1.
Figure 4B:
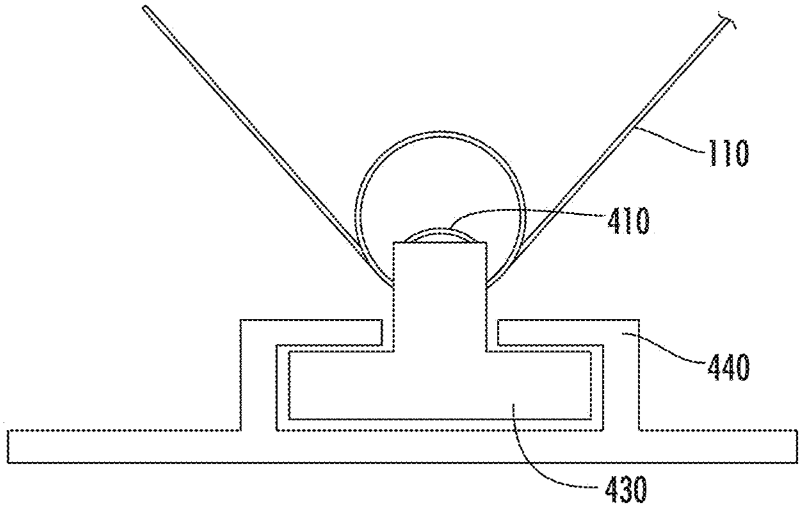

FIG. 4B is a cross section of a grille along the line 4B-4B in FIG. 1. As shown, a channel is formed by rails 440 and each rail is substantially L-shaped. The distal end of each rail has an extension portion that extends towards the opposite rail with a space therebetween. A gap through which the slide 430 protrudes is formed between the two extension portions that face one another. The slide 430 is able to move laterally along the channel, in a direction into and out of the page. The slide 430 has a first portion with a first width and a second portion with a second width smaller than the first width and that extends from the first portion. The second portion extends through the gap formed by the rails 440 so that the spring 110 can be affixed to the second portion via the screw 410 and retaining arm 420.

Figure 5:
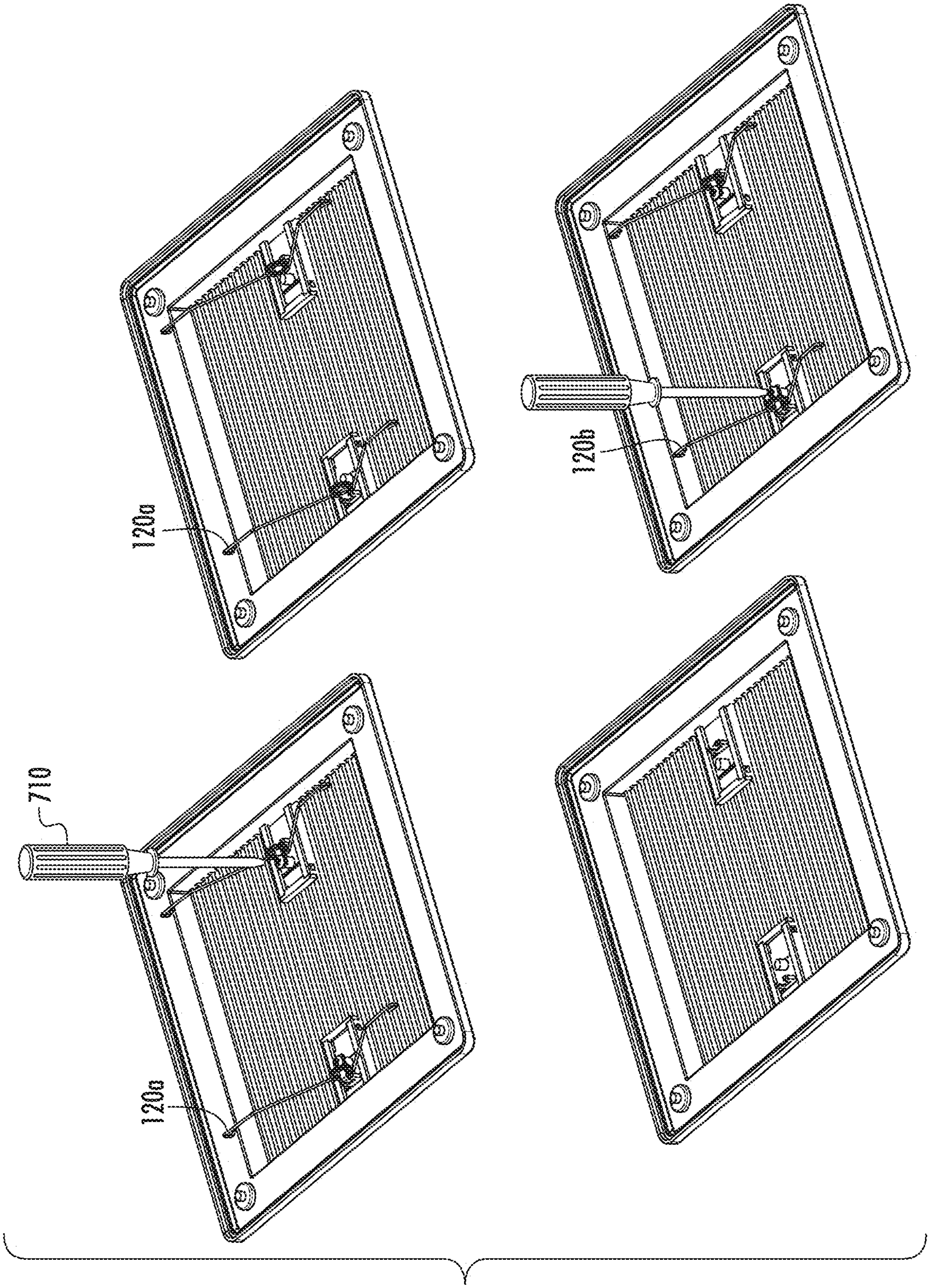
FIG. 5 shows the steps to change a spring.

FIG. 5 are the steps to replace a first spring 120*a* with a second spring 120*b*. The spring can be replaced with another if the first one loses its bias to keep the grille 100 in place or so that it can be mounted to a different housing. To replace the first spring, the screw 410 is removed using a screwdriver 710. It should be noted that the screw 410 can be any type of screw such as a phillips head, slotted, square, hex, torx, thumb screw, socket, or the like. Once the screw is removed, the retaining arm 420 can be removed freeing the spring. The first spring 120*a* is then removed from the slide 430. It should be noted that removing the retaining arm 420 and slide 430 does not free the slide from the channel formed by rails 440.

The slide 430 is now ready to receive the second spring 120*b*. The second spring 120*b* is placed in the spring receptacle 470 of the slide 430. The second spring is placed in the receptacle 470. The retaining arm 420 is placed through the center of the circular portion of the spring to cover the receptacle 470 and retain the spring 120*b* in the slide 430. The screw 410 is then reattached to the slide 430 to keep the retaining arm 420 in place.

Figure 6:
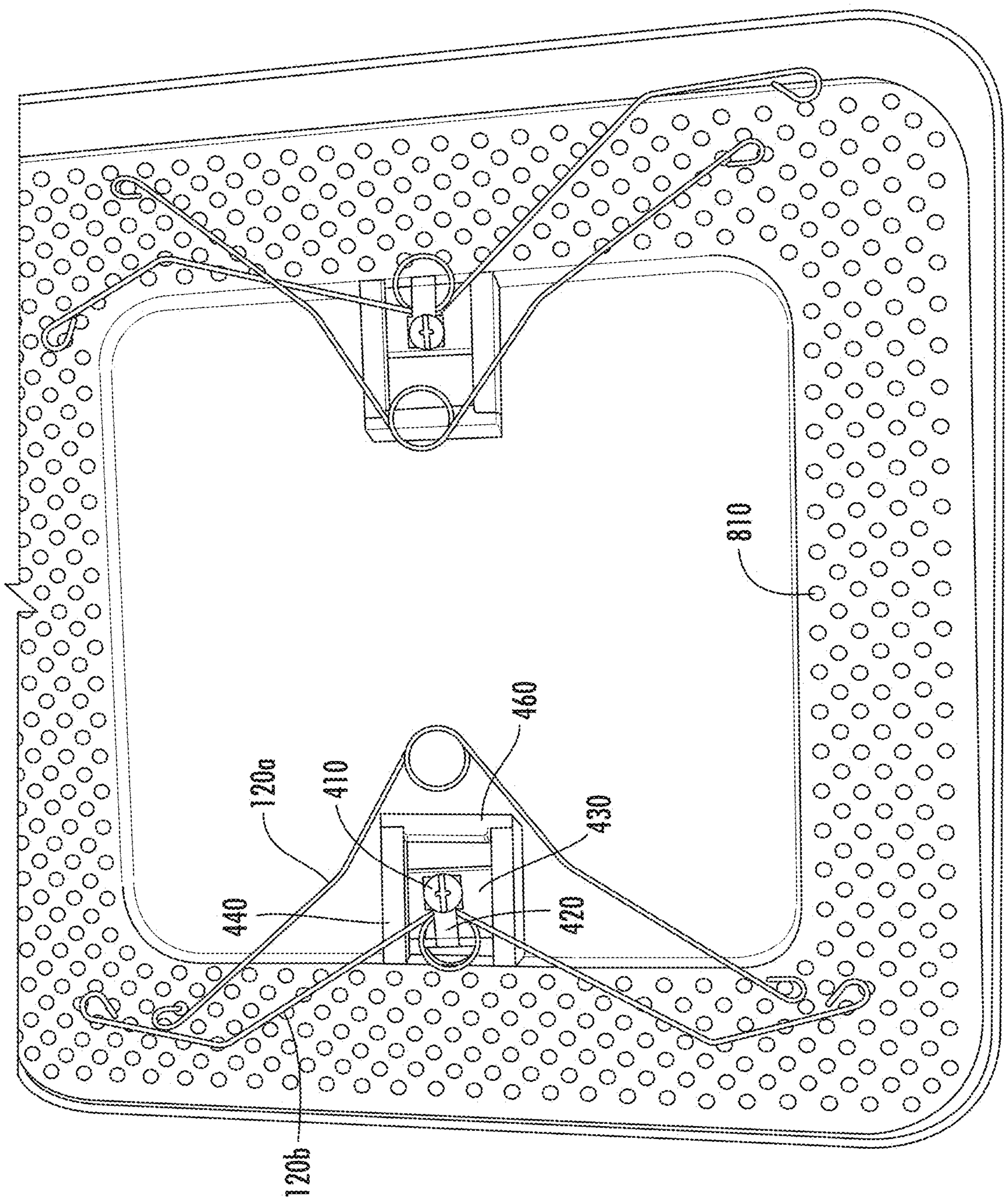
FIG. 6 is a rear view of a grille with extra springs.

FIG. 6 is a rear view of a grille 100 and extra springs 120*a*, 120*b*. As shown, the grille has a plurality of holes 810 configured to provide airflow for a vent or exhaust fan. According to one aspect of the invention, the end wall 460 is separate from the rails 440. During assembly of the grille 100, the slide 430 is placed between the rails 440 prior to end wall 460 being installed. After the slide 430 is arranged in the channel formed by the rails 440, the end wall 460 is affixed to the grille 100 to close the channel to prevent the slide 430 from detaching from the grille 100. The end wall is affixed using glue, thermoset epoxy, or the like.

Figure 7:
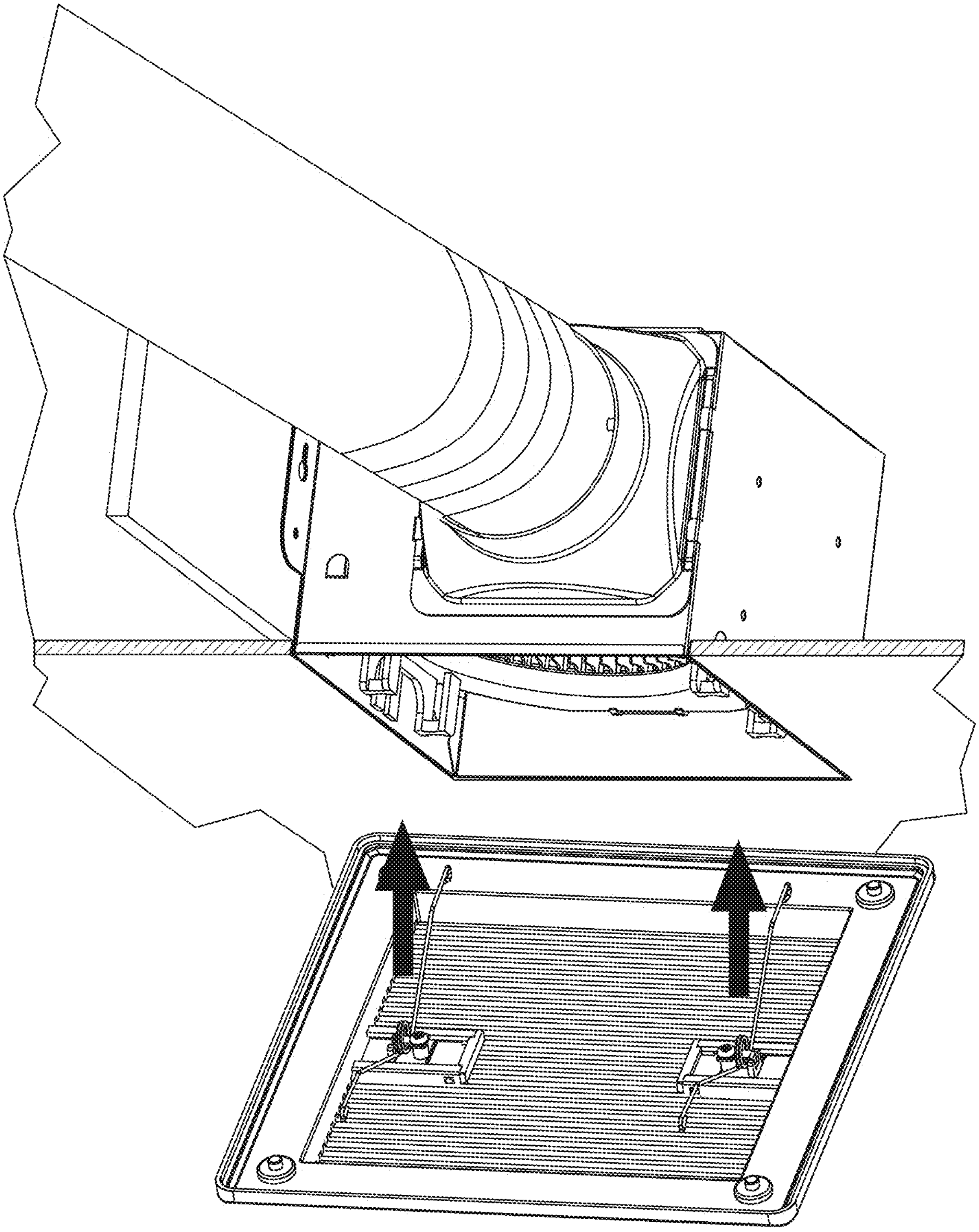
FIG. 7 depicts mounting a housing and grille.

FIG. 7 shows an installed fixture ready to receive a grille. The positioning of the springs is adjusted to match the spacing of the mounting slots on the housing. Respective ends of the springs are then inserted into the slots and the grille is pushed into place. Changing the grille comprises removing an existing one, installing an appropriate spring in a new grille and installing the grille in the housing.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps that perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A universal mount for a grille, comprising:

a first grille surface configured to face a fixture;

a pair of opposing rails that extend from the first grille surface, wherein each of the opposing rails has a lateral extension, the lateral extensions facing each other forming a gap;

a slide arranged between the first grille surface and the lateral extensions and configured to move along the pair of opposing rails; and at least one end wall arranged at a lateral end of the pair of opposing rails configured to limit movement of the slide.

2. The universal mount of claim 1, wherein the slide comprises:

a first portion having a first width and arranged proximate to the first grille surface; and a second portion having a second width that extends from the first portion away from the first grille surface, wherein the first width is greater than the second width.

3. The universal mount of claim 2, wherein the slide further comprises:

a spring receptacle arranged in the second portion configured to receive a grille mounting spring; and a retaining arm configured to enclose an upper end of the spring receptacle.

4. The universal mount of claim 3, wherein the retaining arm is attached to the second portion by a screw.

5. A grille kit comprising:

a grille comprising a universal mount, comprising:

a first grille surface configured to face a fixture;

a pair of opposing rails that extend from the first grille surface, wherein each of the opposing rails has a lateral extension, the lateral extensions facing each other forming a gap;

a slide arranged between the first grille surface and the lateral extensions and configured to move along the pair of opposing rails; and at least one end wall arranged at a lateral end of the pair of opposing rails configured to limit movement of the slide; and at least two pairs of springs.

* * * * *